United States Patent
Matzo et al.

[11] Patent Number: 6,104,480
[45] Date of Patent: Aug. 15, 2000

[54] ANGLE MEASURING DEVICE

[75] Inventors: David Matzo, Pliezhausen; Uwe Skultety-Betz, Leinfelden-Echterdingen, both of Germany

[73] Assignee: Robert Bosch GmbH, Stuttgart, Germany

[21] Appl. No.: 09/135,337

[22] Filed: Aug. 17, 1998

[30] Foreign Application Priority Data

Oct. 2, 1997 [DE] Germany .......................... 197 43 568

[51] Int. Cl.⁷ .............................. G01C 1/10; B43L 13/00
[52] U.S. Cl. ............................................. 356/148; 33/471
[58] Field of Search ................................ 356/148, 140; 33/341, 452, 471, 495, 496, 497, 498, 499, 500

[56] References Cited

U.S. PATENT DOCUMENTS 4,513,512  4/1985  Fischer ........................................ 33/471
4,664,519  5/1987  Hullein et al. ........................... 356/152

FOREIGN PATENT DOCUMENTS 89 02 987     6/1989  Germany .
297 03 041
      U1      5/1997  Germany .

*Primary Examiner*—Frank G. Font
*Assistant Examiner*—Michael P. Stafira
*Attorney, Agent, or Firm*—Michael J. Striker

[57] ABSTRACT

An angle measuring device comprising two legs, a hinge supporting the legs turnably relative to one another about a common axis, at least one rotor, drive unit driving the rotor rotatably about a rotary axis coincided with the turning axis, reference points associated with the legs, at least one reference mark rotating together with the rotor and passing the reference points over a rotary path, the hinge having a central bearing part which is fixedly connected with one of the legs, and a bearing receptacle provided for the other of the legs and arranged concentrically to the turning axis.

15 Claims, 3 Drawing Sheets

ANGLE MEASURING DEVICE

BACKGROUND OF THE INVENTION

The present invention relates to angle measuring devices.

One of such angle measuring devices is disclosed for example in the German patent document DE-U-89 02987.9. In this measuring device two legs are provided which are turnable relative to one another about a joint turning axis, and they are coupled with one another through a potentiometer which measures an angle enclosed between the two legs. Due to the contact of the slider and resistance track of the potentiometer, during a long service time undesired wear can occur. Moreover, the potentiometric measurement of the angle is connected with errors located over a desired angle resolution in the region of 0.1°.

Another angle measuring device is disclosed in the German patent document DE 297 03 041 U1. Here the two rotatively coupled discs are driven in rotation and cooperate each with a leg-fixed sensor. The drive shaft and the sensors are supported in this angle measuring device on different legs, which provides an increased measuring accuracy. The provision of the two discs with the associated sensor means is however expensive and complicated to manufacture. The substantial space which is required for the known measuring device makes it impossible the accommodation of the drive of the disc inside a turning link of the leg. Thereby the taking down an angle adjusted between the legs or the abutment of the leg on an angle to be determined is difficult. The opposite support of the leg is performed by three roller bearings arranged in a plane, which can not guarantee a sufficient concentricity of the legs during the manufacture.

SUMMARY OF THE INVENTION

Accordingly, it is an object of the present invention to provide an angle measuring device which avoids the disadvantages of the prior art.

More particularly, its an object of present invention to provide an angle measuring device which makes possible a cost-favorable angle measurement with a high measuring accuracy.

In keeping with these objects and with others which will become apparent hereinafter, one feature of present invention resides, briefly stated, in an angle measuring device in which a hinge which turnably connects with one another at least two legs for turning about a common turning axis has a central bearing part which is fixedly connected with one of the legs and forms a bearing receptacle for the other of said legs arranged concentrically to the turning axis.

When the angle measuring device is designed in accordance with the present invention, it eliminates the disadvantages of the prior art and provides for the above mentioned highly advantageous results.

In accordance with another advantageous feature of present invention, the hinge is formed with a cylindrical bearing part which receives the drive means. In this way a space-economical arrangement is possible, which provides the accommodation of the turning hinge inside the leg profile.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
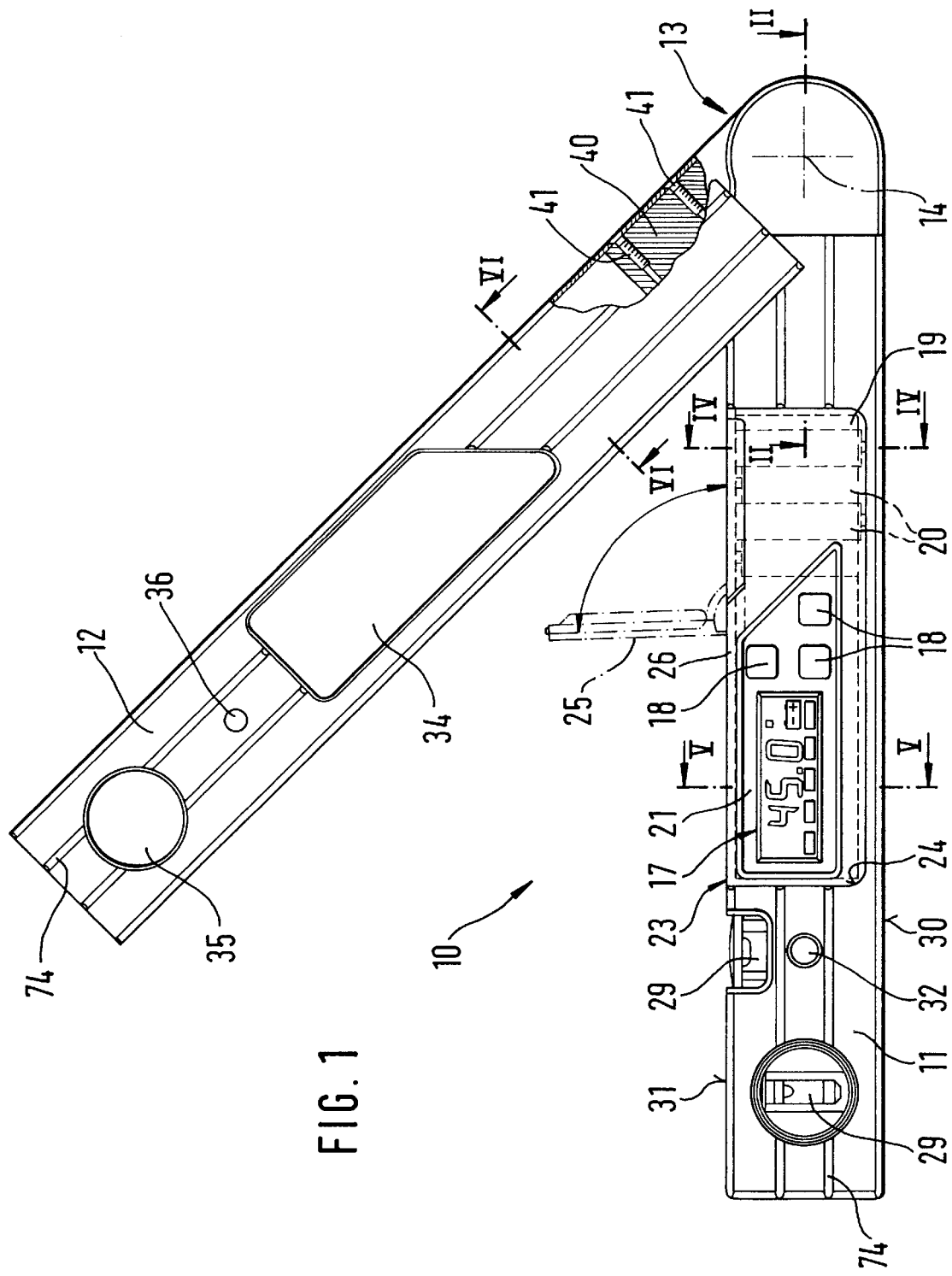
FIG. 1 is a view showing an angle measuring device in accordance with the present invention.

FIG. 1 shows an angle measuring device in accordance with the present invention which is identified with reference numeral 10. It has a first leg 11 and a second leg 12. The legs 11 and 12 are connected by a hinge 13 turnably relative to one another about a common turning axis 14. The first leg 11 is formed as rectangular hollow profile 11a and the second leg 12 is formed as a U-shaped profile 12a. An open side of the U-shaped profile 12a faces the hollow profile 11a so that the hollow profile 11a is received by the U-shaped profile 12a in a folded position of the angle measuring device 10.

An indicating device 17 for indicating angle values and operational buttons 18 for inputting of commands are arranged in the hollow profile 11a of the first leg 11. Moreover, the first leg 11 accommodates a battery housing 19 for receiving batteries or accumulator cells 20 identified in broken lines, and an evaluation device 21 coupled with the indicating device 17. The components 17–21 are assembled to form a mounting assembly 23 and inserted into a U-shaped recess in the first leg 11 which opens toward the second leg 12. The battery housing 19 is closeable by a cover 25 which is articulately supported in a housing 26 of the mounting unit 23. For closure of the battery housing 19 it is arrested with the housing 26. Water balance levels 28, 29 for vertical and horizontal orientation of the first leg 11 are located in the first leg. The levers 28, 29 are located on a first support surface 30 on the first leg 11 extending parallel to an inner support surface 31. A throughgoing opening 32 extends through the first leg 11 in the transverse direction parallel to the turning axis 14.

The U-shaped second leg 12 has different window-shaped side recesses in its both parallel end surfaces. A first side window 34 is designed for reading the indicating device 17 and operation of the operational buttons 18 in the folded position. A second side window 35 provides in this position the view of the level 29. A window 36 coincides in the folded position with the throughgoing opening 32 so that the angle measuring device 10 in the folded position can be suspended for example on wall hooks.

Figure 2:
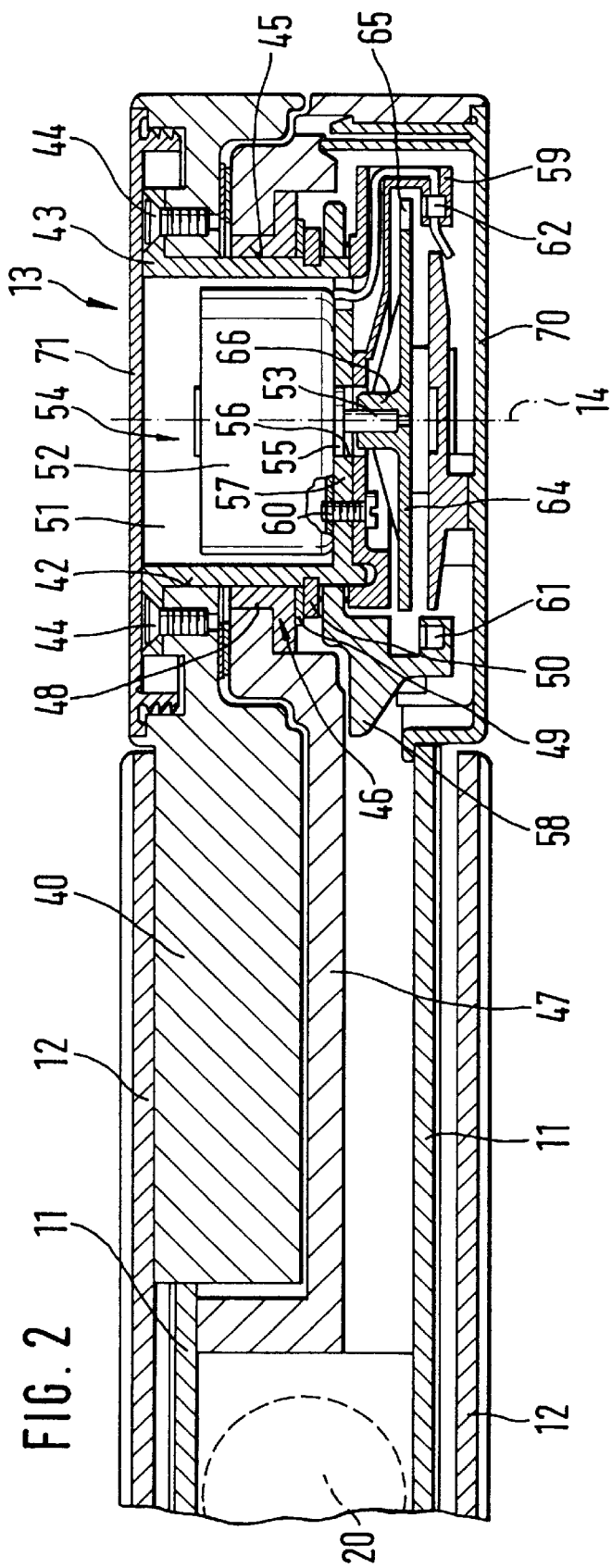
FIG. 2 is a view showing a section of the angle measuring device taken along with line II—II in FIG. 3.

The hinge 13 is shown in detail in FIG. 2. A base body 40 is mounted on the U-shaped profile of the second leg 12 by screws 41 shown in FIG. 1. The base body 40 forms in the region of the hinge 13 a cylindrical receptacle 42. A bearing part 43 is centrally inserted in the cylindrical receptacle 42 and fixed by mounting screws 44. The bearing part 43 is formed hollow cylindrical. The bearing part 43 inwardly forms a cup bottom 57. With its outer periphery 45, the bearing part 43 forms a bearing receptacle 46. The bearing receptacle 46 is located concentrically to the turning axis 14 and supports a turning arm 47 through a sliding bushing 48 on the bearing part 43. The turning arm 47 is connected with the first leg 11 non-rotatably. The sliding bushing 48 is secured axially on the bearing part 43 through a sliding ring 49 and a spring ring 50. A not shown spring disc or flat spring between the spring ring 50 and the sliding bushing 48 is provided for compensation of the axial gap and for the desired rotary resistance between the legs 11,12.

An electrical drive motor 52 is received in the bearing part 43, in its central hollow space 51. The drive motor 52 has a drive shaft 53 extending concentrically to the turning axis 14. The drive shaft 53 extends outwardly of a cylindrical bearing projection 55 which is formed by the housing of the drive motor 52. It is centered by engagement in a concentric opening 56 in the bottom 57 of the bearing part 43 so as to be in alignment with the turning axis 14. The drive motor 52 and the drive shaft 53 form drive means 54 for a rotor 64.

A turning support 58 is rotatably supported on the outer periphery 45 of the wearing part 43 and rotatably coupled with the first leg 11. A further support 59 is fixedly connected through a holding screw 60 with the bearing part 43 and arranged non-rotatably on the second leg 12. The turning support 58 and the support 59 carry each a sensor 61, 62. In the shown example the sensors 61, 62 are formed as light barriers, however other contactless sensors can be used, such as for example Hall transducers.

The rotor 34 is non-rotatably arranged on the drive shaft 53. The rotor 34 is formed as a circular disc with a projection 65 formed radially outwardly. For mounting on the drive shaft 53, the rotor 64 is provided with a hub 66. The hub 66 is connected with the disc-shaped part of the rotor 64 by ribs 67 for stability reasons. A compensating opening 68 is provided in the disc-shaped part between the projection 65 and the turning axis 14 for compensating an imbalance caused by the projection 65.

Figure 3A:
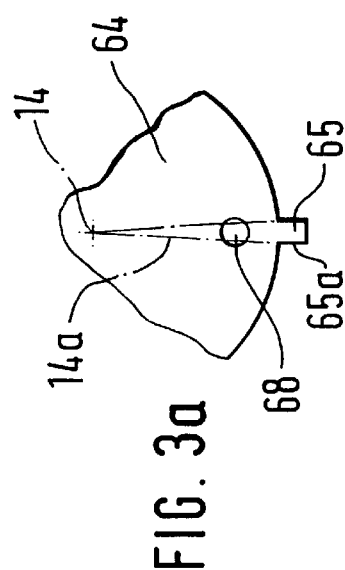
FIG. 3a is a partial view of the rotor of the inventive device of FIG. 2.
Figure 3:
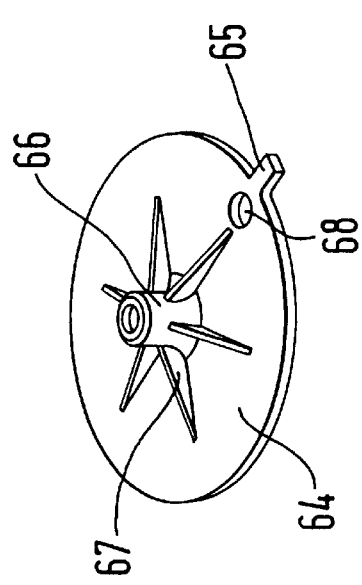
FIG. 3 is a perspective view of the rotor of the inventive device shown in FIG. 2.

FIG. 3a shows the projection 65 which is arranged on the outer periphery of the rotor 64. The projection 65 has a breaking edge 65a which extends at least in the region of the covering with the sensor 61, 62 along a radial ray 14a extending through the turning axis 14. In this way, the interruption is independent from tolerances relative to the distance of the turning axis 14 and the projection 65.

The hinge 13 is covered at the side of the first leg 11 by a first cover 70 and at the side of the second leg 12 by a cover 71. The drive motor 72 is connected through not shown connecting conductors with the batteries 20. The hinge 13 is formed compact so that it is located inside a width B of the second leg 12. Thereby a very good abutment properties for the angle measuring device 10 are provided.

Figure 6:
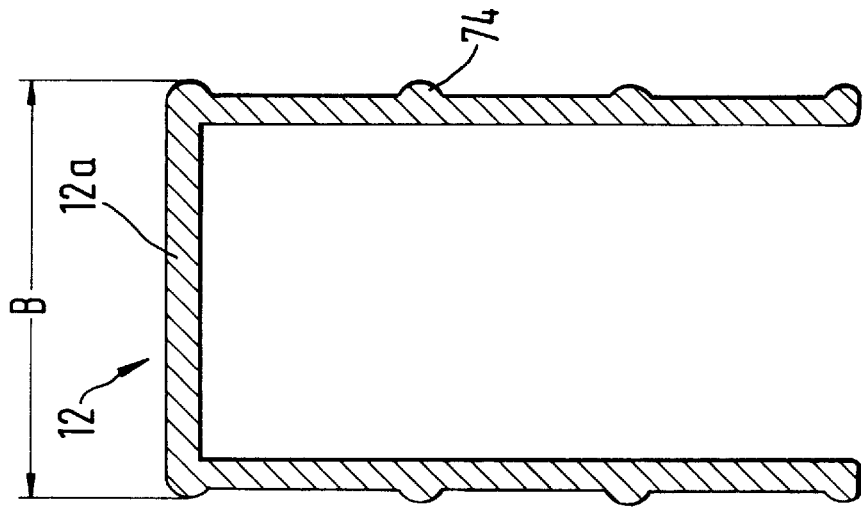
FIG. 6 is a view showing a section of the angle measuring device taken along the VI—VI in FIG. 1.
Figure 5:
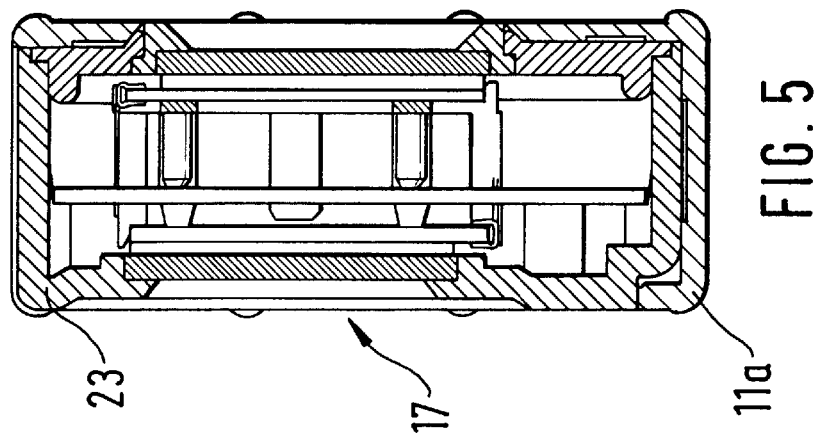
FIG. 5 is a view showing a section of the inventive angle measuring device taken along the line V—V in FIG. 1.
Figure 4:
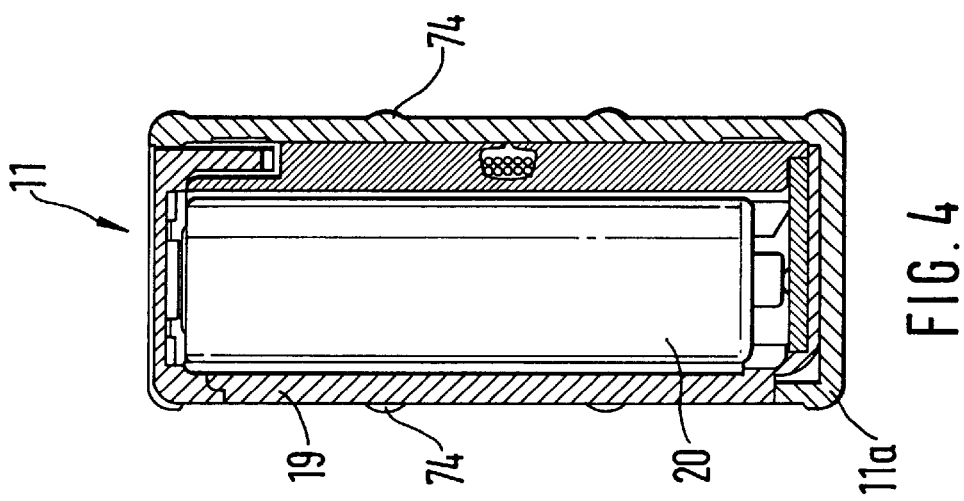
FIG. 4 is a view showing a section of the inventive angle measuring device taken along the line IV—IV in FIG. 1.

In FIGS. 4 and 5 the leg 11 is correspondingly sectioned. In FIG. 4 a battery 20 can be seen in the battery housing 19, and in FIG. 5 the indicating device 17 can be seen in the mounting unit 23. FIG. 6 shows the U-shaped profile of the second leg 12 which receives the first leg 11.

The angle measuring device in accordance with the present invention operates in the following manner.

For angle measurements, the rotor 64 is set in rotation by the drive means 54. The sensor 61, 62 periodically pass the interrupting edge 65a of the projection 65. The sensor 61, 62 during the passage of the projection 65 produce corresponding signal level changes, which are detected in the evaluation device 21 preferably by electronic counter and converted into angle values. By determination of the time between the passage of the sensors 61, 62 and the determination of the time to the new passage of the corresponding sensor 61, 62 an angle ratio can be formed which is independent from rotary speed deviation between different passages. The corresponding angle ratio is multiplied with a constant angle value, for example 360°, and outputted to the indication device 17.

It will be understood that each of the elements described above, or two or more together, may also find a useful application in other types of constructions differing from the types described above.

While the invention has been illustrated and described as embodied in angle measuring device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. An angle measuring device comprising two legs; a hinge supporting said legs turnably relative to one another about a common axis; at least one rotor; drive means driving said rotor rotatably about a rotary axis coinciding with said turning axis; reference points associated with said legs; at least one reference mark rotating together with said rotor and passing said reference points over a rotary path, said hinge having a central bearing part which is fixedly connected with one of said legs and forms bearing receptacle provided for the other of said legs and arranged concentrically to said turning axis.

2. An angle measuring device as defined in claim 1, wherein said bearing part is hollow cylindrical and at least partially receives said drive means, said bearing receptacle for the other of said legs being provided on an outer periphery of said bearing part.

3. An angle measuring device as defined in claim 2, wherein said bearing part is cup-shaped.

4. An angle measuring device as defined in claim 2, wherein said drive means has a drive motor provided with a bearing projection which is oriented concentrically to a rotary axis of said drive shaft and which engages in an opening formed in a bottom of said cup-shaped bearing part concentrically to said turning axis.

5. An angle measuring device as defined in claim 1, wherein said one leg is composed of a U-shaped profile, said other leg being composed of a rectangular hollow profile, said U-shaped profile receiving said hollow profile in a folded position of the angle measuring device.

6. An angle measuring device as defined in claim 5, wherein each of said legs has at least one throughgoing opening which in the folded position of the angle measuring device coincides with a corresponding throughgoing opening of another of said legs.

7. An angle measuring device as defined in claim 1, wherein said reference points of said legs are arranged so that they are passed one after the other by said reference mark of said rotor.

8. An angle measuring device as defined in claim 1, wherein said reference points are formed by sensors.

9. An angle measuring device as defined in claim 8, wherein said sensors are formed by fork light barriers, said reference marks at a side of said rotor being formed by a projection extending outwardly beyond a periphery of said rotor.

10. An angle measuring device as defined in claim 9, wherein said projection has an interruption edge which is formed at least partially along a radial ray extending through said turning axis.

11. An angle measuring device as defined in claim 10, wherein said rotor is formed substantially as a disc which, for compensation of imbalance, is provided with a compensating opening radially between said projection and said turning axis.

12. An angle measuring device as defined in claim 1, wherein said bearing part supports a turning support concentrically to said turning axis, said turning support being non-rotatably connected with said other leg and carries a sensor associated with said other leg.

13. An angle measuring device as defined in claim 1; and further comprising a support non-rotatably supported on said bearing part and carrying a sensor associated with said second leg.

14. An angle measuring device as defined in claim 1, wherein said legs are provided with lateral measuring surfaces and abutment surfaces which are offset relative to said measuring surfaces by 90° and provided with outwardly projecting ribs.

15. An angle measuring device as defined in claim 1, wherein one of said legs is provided with an evaluating device which together with an indicating device and operational buttons is assembled to form a mounting assembly which is inserted in a corresponding one of said legs.

* * * * *